(12) United States Patent
Narita et al.

(10) Patent No.: US 10,252,647 B2
(45) Date of Patent: Apr. 9, 2019

(54) VEHICLE SEAT

(71) Applicant: TACHI-S CO., LTD., Akishima-shi, Tokyo (JP)

(72) Inventors: Norihisa Narita, Tokyo (JP); Hiromi Yamamoto, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/581,312

(22) Filed: Apr. 28, 2017

(65) Prior Publication Data

US 2017/0313214 A1 Nov. 2, 2017

(30) Foreign Application Priority Data

Apr. 28, 2016 (JP) ................................. 2016-090757

(51) Int. Cl.
*B60N 2/30* (2006.01)

(52) U.S. Cl.
CPC ........... *B60N 2/3072* (2013.01); *B60N 2/309* (2013.01); *B60N 2/3011* (2013.01); *B60N 2/3065* (2013.01)

(58) Field of Classification Search
CPC .... B60N 2/3018; B60N 2/305; B60N 2/3075; B60N 2/919; B60N 2002/022; B60N 2002/0264; B60N 2/01583
USPC ........... 296/65.16, 65.06, 64, 190, 164, 204, 296/65.01, 65.15, 65.12; 297/344.21, 297/330, 314, 240, 15, 326, 332, 333; 248/421, 430, 242, 393, 422, 503.1
See application file for complete search history.

(56) References Cited

U.S. PATENT DOCUMENTS

| | | | | |
|---|---|---|---|---|
| 5,718,477 A | * | 2/1998 | Schuler | B60N 2/0705 297/341 |
| 6,070,934 A | * | 6/2000 | Schaefer | B60N 2/206 296/65.09 |
| 6,231,102 B1 | * | 5/2001 | Wyszogrod | B60N 2/3011 296/65.01 |
| 7,413,251 B2 | * | 8/2008 | Link | B60N 2/0705 297/334 |
| 7,562,926 B2 | * | 7/2009 | Kojima | B60N 2/123 296/65.09 |
| 8,292,366 B2 | * | 10/2012 | Ma | B60N 2/065 297/341 |

(Continued)

FOREIGN PATENT DOCUMENTS

| | | |
|---|---|---|
| JP | H03-65445 A | 3/1991 |
| JP | 2015-020602 A | 2/2015 |
| JP | 2015-214258 A | 12/2015 |

*Primary Examiner* — D Glenn Dayoan
*Assistant Examiner* — Sunsurraye Westbrook
(74) *Attorney, Agent, or Firm* — Shapiro, Gabor and Rosenberger, PLLC

(57) ABSTRACT

In a rear seat having a configuration which, in the state that a seat cushion is folded forward with a seat back flattened on the seat cushion side, makes an upward back surface of the seat back become almost the same height with a floor surface of a cargo room, to avoid giving a restriction and hurt in amenity to a passenger seated on the seat cushion in the space on which feet of are put, the present invention provides a vehicle seat to which parallel link mechanism portions are equipped that connect the seat cushion to a floor surface under the seat cushion of the vehicle, and a mechanism is provided to fold the seat cushion forward with the posture of the seat back held by the parallel link mechanisms in the state that the seat back is flattened to the seat cushion side.

9 Claims, 3 Drawing Sheets

(56) References Cited

U.S. PATENT DOCUMENTS

2004/0041431 A1\* 3/2004 Ito .................... B60N 2/3013
  296/65.05
2015/0021958 A1 1/2015 Fukutani et al.

\* cited by examiner

VEHICLE SEAT

CLAIM OF PRIORITY

The present application claims priority from Japanese Patent Application JP 2016-090757 filed on Apr. 28, 2016, the content of which is hereby incorporated by reference into this application.

BACKGROUND OF THE INVENTION

The present invention relates to a vehicle seat and particularly, to a vehicle seat used as a rear seat in a vehicle and being capable of forming a spacious space in a vehicle cabin with a seat back flattened to a seat cushion side.

Some of the rearmost seat backs of vehicle seats provided in two rows or three rows are capable of flattening to a seat cushion side. As a result, it is possible to form a spacious space at a rear portion in a vehicle, and hence, a larger baggage can easily be loaded.

As a configuration that enables the seat back to be flatted to the seat cushion side, Japanese Unexamined Patent Application Publication No. H3-65445 (Patent Literature 1) describes a structure in which a front link and a rear link are interposed between a seat cushion frame and a base frame of a vehicle floor.

Further, Japanese Unexamined Patent Application Publication No. 2015-20602 (Patent Literature 2) describes a dive-down seat taking a configuration in which, when a seat back is further flattened with a support leg at a front end portion of a seat cushion landed on a floor, the relation between links is broken whereby the seat cushion is urged to be moved forward to make a lower end of a front leg come off from an insertion opening of a lock mechanism. With this configuration, the dive-down seat can flatten the seat back completely because restrictions can be released on the forward movement of the seat cushion as well as on the forward flattening of the seat back, so that a back surface of the seat back can be utilized as a carrying surface of a cargo room.

Further, Japanese Unexamined Patent Application Publication No. 2015-214258 (Patent Literature 3) describes a configuration in which a cushion frame and a vehicle floor are connected through link members to make bridges therebetween.

As vehicles are enhanced in function, there has emerged a vehicle whose floor is made to be higher than that of those in prior art because components are assembled under a rear seat and the floor of a cargo room.

In the vehicle in which floors at the rear seat and the cargo room are famed to be high as above, it is preferable that, when the seat cushion is folded with the seat back flattened to the seat cushion side, the upward back surface of the seat back becomes almost the same height with the surface of the cargo room which is a little higher than the floor surface. With the configuration taken like this, a spacious space can be formed at a rear portion inside of the vehicle cabin, and hence, it becomes possible to load a larger baggage easily.

However, in the configuration described in Japanese Unexamined Patent Application Publication No. H3-65445, consideration is not taken into making the upward back surface of the seat back, in a state of being folded with the seat back flattened to the seat cushion side, reside at almost the same height with the surface of the cargo room which is a little higher than the floor surface. As a result, in the seat described in Japanese Unexamined Patent Application Publication No. H3-65445, the upward back surface of the seat back, in a state of being folded with the seat back flattened to the seat cushion side, protrudes beyond the surface of the cargo room which is a little higher than the floor surface.

Further, in the dive-down seat described in Japanese Unexamined Patent Application Publication No. 2015-20602, the configuration is taken in which, when the seat back is further flattened with the front end portion of the seat cushion landed on the floor, the relation between the links is broken whereby the seat cushion is urged to be moved forward to make the lower end of the front leg come off from the insertion opening of the lock mechanism. Due to this configuration, an effort to restore the relation once broken between the links becomes necessary in returning the seat cushion to the original position.

On the other hand, in Japanese Unexamined Patent Application Publication No. 2015-214258, the structure is described in which the upward back surface of the seat back of the rear seat, in a state of being folded with the seat back flattened to the seat cushion side, becomes almost the same height with the surface of the cargo room which is a little higher than the floor surface. As the configuration in which the seat back is folded by being flattened to the seat cushion side, the configuration is taken that connects the cushion frame to the floor surface of the vehicle through the link members.

However, in the configuration described in Japanese Unexamined Patent Application Publication No. 2015-214258, the structure is taken in which a portion on the floor surface side of the link member connecting the cushion frame to the floor of the vehicle protrudes beyond the seat cushion. In the structure like this, a restriction by the link member is exerted to the space in which the feet of the passenger seated on the seat cushion are put, and thus, there is a possibility of hurting the passenger at the rear seat in amenity.

SUMMARY OF THE INVENTION

Therefore, the present invention has been made to solve the foregoing problems in the prior art, and it is an object of the present invention to provide a vehicle seat equipped with a rear seat having a structure which makes an upward back surface of a seat back of the rear seat, in a state of being folded with the seat back flattened to the seat cushion side, become almost the same height with the surface of the cargo room which is a little higher than the floor surface, and the structure does not exert a restriction to a space in which the feet of a passenger seated on the seat cushion are put, so that the passenger at the rear seat is not hurt in amenity.

In order to solve the aforementioned problems, the present invention resides in a vehicle seat provided with a seat cushion and a seat back, wherein the seat cushion is connected by a link mechanism to a floor surface being higher than a floor surface on which the feet of a passenger seated on the vehicle seat are put, and in the vehicle seat, a portion of the seat cushion is formed to be thin to a thickness which does not interfere with the floor surface, being higher than the floor surface on which the feet of the passenger are put, in the state that the seat cushion connected by the link mechanism is moved forward to be pushed down relative to the floor surface being higher than the floor surface on which the feet of the passenger at the seat cushion are put.

Further, in order to solve the aforementioned problems, in the present invention, a configuration is taken wherein, in a vehicle seat provided with a seat cushion and a seat back, parallel link mechanism portions are provided connecting the seat cushion to a floor surface under the seat cushion of a vehicle, and in the configuration, the seat cushion is folded forward with the parallel link mechanism portions keeping the posture of the seat back in the state that the seat back is flattened to the seat cushion side.

According to the present invention, the vehicle seat is provided with the rear seat having the structure which makes an upward back surface of the seat back of the rear seat, in a state of being folded with the seat back flattened to the seat cushion side, become almost the same height with the surface of the cargo room which is a little higher than the floor surface, and the structure does not exert a restriction to the space in which the feet of a passenger seated on the seat cushion are put, so that the passenger at the rear seat is not hurt in amenity.

These features and advantages of the invention will be apparent from the following more particular description of preferred embodiments of the invention, as illustrated in the accompanying drawings.

DESCRIPTION OF THE PREFERRED EMBODIMENTS

The present invention is designed so that in a vehicle seat having of a dive-down configuration which further folds a seat cushion forward and down with a seat back flattened to the seat cushion side, link mechanism portions for effecting the dive-down are attached to a floor surface right under a rear seat. Thus, the feet of a passenger seated on the rear seat can be prevented from hitting on the link mechanism, and hence, the passenger at the rear seat can be prevented from being hurt in amenity.

Further, the present invention is designed so that the dive-down can be easily performed as a result of enabling the operation for the dive-down to be performed by one motion.

Hereinafter, embodiments of the present invention will be described with reference to the drawings.

First Embodiment

A vehicle seat in a first embodiment will be described with reference to FIG. 1 through FIG. 3.

Figure 1:
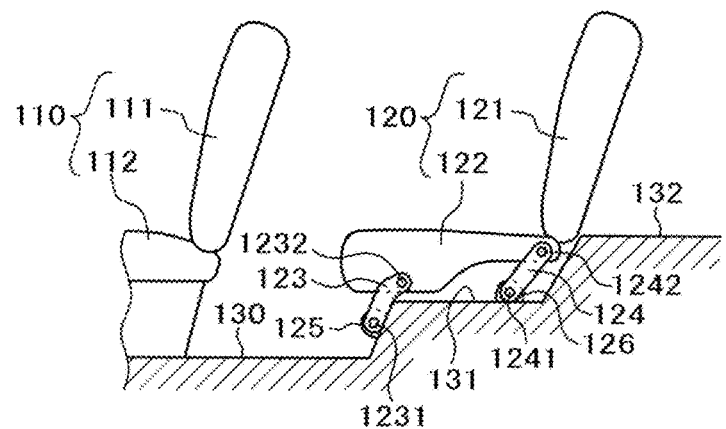
FIG. 1 is a figure showing a vehicle seat in a first embodiment of the present invention and is a side view of the vehicle seat with a seat back of a rear seat upstanding.

FIG. 1 is a figure in which the vehicle seat is viewed on a side, and the vehicle seat is provided with a front seat 110 equipped with a seat back 111 and a seat cushion 112 and a rear seat 120 equipped with a seat back 121 and a seat cushion 122. The state in FIG. 1 shows an ordinary state that a passenger is enabled to be seated on the rear seat 120.

The seat cushion 122 of the rear seat 120 is supported by a link mechanism composed of a link 123 and a link 124. A lower end of the link 124 on a rear side is pivotably supported on the floor 131, while a lower end of the link 123 on a front side is pivotably supported at a portion close to the floor surface 131 on the slant surface portion connecting the floor surface 131 and the floor surface 130. The link mechanism composed of the link 123 and the link 124 may be provided on each of the opposite sides of the seat cushion 122 and may be as a pair on the left and right sides of the seat cushion 122.

Regarding the floor surface of the vehicle in the present embodiment, the floor surface 131 under the seat cushion 122 is formed to be higher one step than the floor surface 130 on which the passenger seated on the rear seat 120 puts his/her feet. Further, the floor surface 132 of a cargo room behind the rear seat 120 is formed to be higher than the floor surface 131. Of the link mechanism composed of the link 123 and the link 124, the lower end of the link 124 on the rear side is pivotably supported on the floor 131, while a lower end of the link 123 on a front side is pivotably supported at a portion close to the floor surface 131 on the slant surface portion connecting the floor surface 131 and the floor surface 130 on which the passenger seated on the rear seat 120 puts his/her feet.

The link 123 is engaged at around one (i.e., upper) end portion thereof with a pin 1232 fixed on a frame portion (not shown) of the seat cushion 122. The link 123 is engaged at around the other (i.e., lower) end portion thereof with a pin 1231 supported by a bracket 125 fixed on the slant surface portion connecting the floor surface 131 and the floor surface 130.

On the other hand, the link 124 is engaged at around one (i.e., upper) end portion thereof with a pin 1242 fixed on the frame portion (not shown) of the seat cushion 122. The link 124 is engaged at around the other (i.e., lower) end portion with a pin 1241 supported by the bracket 126 fixed on the floor surface 131.

A setting is made that a line which connects the pin 1231 and the pin 1232 supporting the link 123 becomes parallel to a line connecting the pin 1241 and the pin 1242 of the link 124. Thus, the link 123 and the link 124 constitute a parallel link mechanism.

Figure 2:
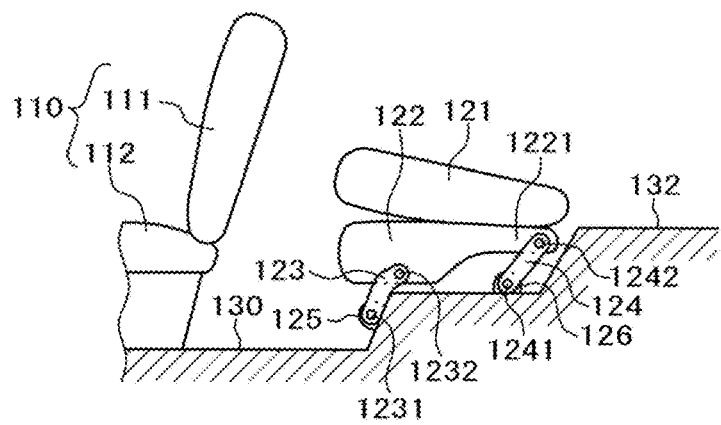
FIG. 2 is a figure showing the vehicle seat in the first embodiment of the present invention and is a side view of the vehicle seat with the seat back of the rear seat flattened on a seat cushion.

FIG. 2 shows a state that the seat back 121 of the rear seat 120 is flattened to the seat cushion 122 side. The seat back 121 of the rear seat 120 is supported to the seat cushion 122 by a support mechanism (not shown). In the state in FIG. 2, the seat back 121 is pivoted around a pivot center of the support mechanism and is flattened to the seat cushion 122 side.

Figure 3:
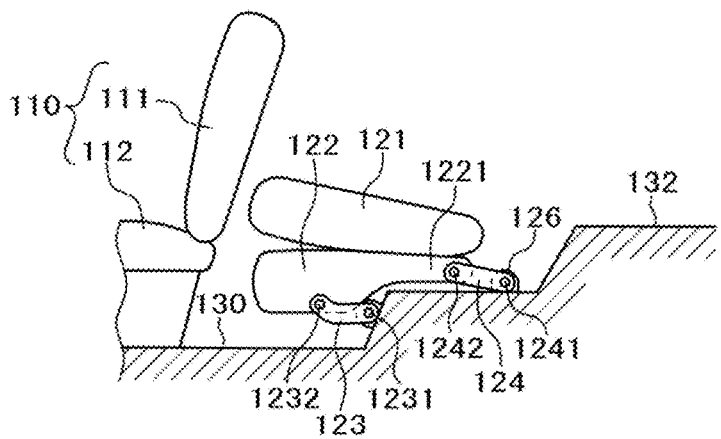
FIG. 3 is a figure showing the vehicle seat in the first embodiment of the present invention and is a side view showing a dive-down state in which the seat back of the rear seat is flattened on the seat cushion and is further folded forward.

FIG. 3 shows the dive-down state that in the state shown in FIG. 2, the seat cushion 122 is folded forward by the parallel link mechanism composed of the link 123 and the link 124.

The link 123 and the link 124 composing the parallel link mechanism are respectively supported through the pin 1231 by the bracket 125 fixed on the slant surface portion connecting the floor surfaces 130 and the floor surfaces 131 and the pin 1241 by the bracket 126 fixed on the floor surface 131. Thus, a line connecting the pins 1232 and 1242 of the links 123 and 124 is moved with parallelism kept relative to a line connecting the pins 1231 and 1241.

That is, when being folded forward (i.e., dive-down) from the state shown in FIG. 2, the seat cushion 122 is moved in the forward-backward direction and in the upward-downward direction while keeping the same posture relative to the floor surface 130 and the floor surface 131, and is moved to the state shown in FIG. 3.

If the seat cushion 122 were uniformly famed in thickness throughout the front to rear portions, the seat cushion 122, when moved from the state shown in FIG. 2 to the forward-folded (dive-down) state shown in FIG. 3, would come to interfere with the floor surface 131 at a rear portion as a result of going down. In the present embodiment, on the contrary, a rear portion 1221 of the seat cushion 122 is formed to be thin in thickness, and thus, a recess is famed at a portion where the seat cushion 122 would otherwise interfere with the floor surface 131 when going down by being moved forward.

By forming the rear portion 1221 of the seat cushion 122 to be thin in thickness like this, it is possible to effectually operate the parallel link mechanism that is configured by the use of the link 123 and the link 124. As a result, when the seat back 122 is further folded forward (dive-down) from the state that the seat back 121 is fattened to the seat cushion 122 side to have its back surface thus being upward and becoming almost in parallel to the floor surface 130, it becomes possible to make the state shown in FIG. 3 with the upward back surface of the seat back 121 held in a posture being almost in parallel to the floor surface 130. In the present embodiment, by the use of the parallel link mechanism, it becomes possible to fold the seat cushion 122 forward (dive-down) by one motion, and hence, the operability can be improved. Further, reversely, the operation for restoring the forward-folded seat cushion 122 to the original position can also be done by one motion.

Further, by adjusting the thickness of the rear portion 1221 of the seat cushion 122, it becomes possible to make the upward back surface of the seat back 121 become at almost the same height as the floor surface 132 in the state that the seat cushion 122 is folded forward (dive-down), and hence, it becomes possible to utilize the space of the cargo room over the floor surface 132 as being more spacious.

According to the present embodiment, because the parallel link mechanism is employed for the configuration that folds the seat cushion 122 forward (dive-down), the seat cushion 122 is enabled by the relatively simple structure to be moved in the forward-rearward direction and in the upward-downward direction. Further, by the employment of the parallel link mechanism, it becomes possible to perform by one motion each of the operation for folding the seat cushion 122 forward (dive-down) and the operation for reversely restoring the forward-folded seat cushion 122 to its original position.

Further, according to the present embodiment, since the link mechanism portions for diving the seat cushion 122 down are attached to the floor surface right under the rear seat, it can be avoided that the passenger seated on the rear seat hits on the link mechanism at his/her feet or legs, and thus, it becomes possible to prevent the passenger at the rear seat from being hurt in amenity.

Second Embodiment

In the present embodiment, a configuration that replaces the rink 124 in the configuration described in the first embodiment with a lock mechanism will be described with reference to FIG. 4 through FIG. 6.

Figure 4:
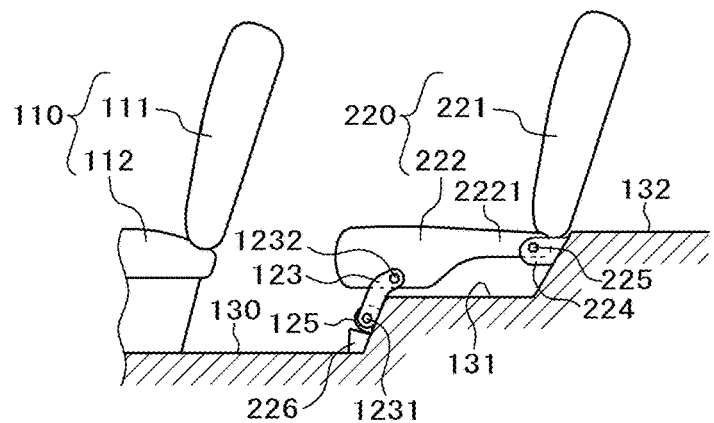
FIG. 4 is a figure showing a vehicle seat in a second embodiment of the present invention and is a side view of a vehicle seat with a seat back of a rear seat upstanding.

FIG. 4 is a figure corresponding to the configuration of FIG. 1 described in the first embodiment. The same components as those described in the first embodiment will be given the same reference numerals and will be omitted from being described.

In the configuration shown in FIG. 4, there is shown a state that a pin 225 fixed to a rear portion of a seat cushion 222 is fitted in a groove portion 2241 (refer to FIG. 6) of a lock mechanism portion 224 secured to the floor surface 132 side. At a front portion of the seat cushion 222, the link 123 is engaged at around one (upper) end portion thereof with the pin 1232 secured to a frame portion (not shown) of the seat cushion 222 and is engaged at around the other (lower) end portion thereof with the pin 1231 that is supported by the bracket 125 secured to the slant surface portion of the floor surface 131.

Figure 5:
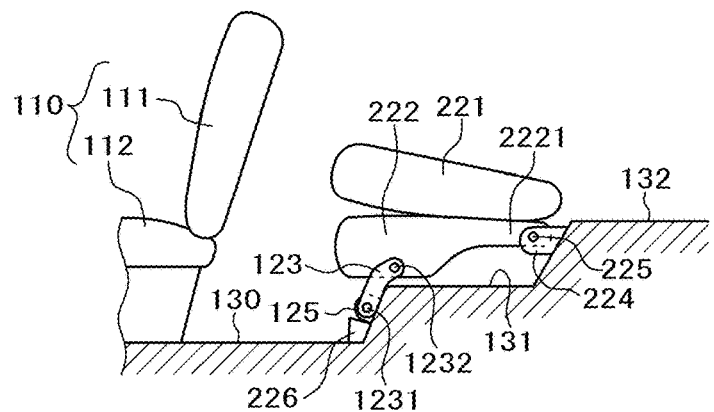
FIG. 5 is a figure showing the vehicle seat in the second embodiment of the present invention and is a side view of the vehicle seat with the seat back of the rear seat flattened on the seat cushion.

FIG. 5 shows a state that a seat back 221 is flattened to the seat cushion 222 side about a pivot center of a support mechanism (not shown).

In this state, the pin 225 secured to the rear portion of the seat cushion 222 is released from being secured by the lock mechanism portion 224 secured to the floor surface 132 side. Then, the seat cushion 222 is pivoted about the pin 1231 through the link 123 to a position where the link 123 runs into a stopper 226, whereby the state shown in FIG. 6 is made.

In order that the upward back surface of the seat back 221 becomes almost the same height as the floor surface 132 in this state, in the present embodiment, a rear portion 2221 of the seat cushion 222 is foi led to be thin in thickness, and thus, a recess is famed at a portion where the seat cushion 222 would otherwise interfere with the floor surface 131 when going down by being moved forward.

Figure 6:
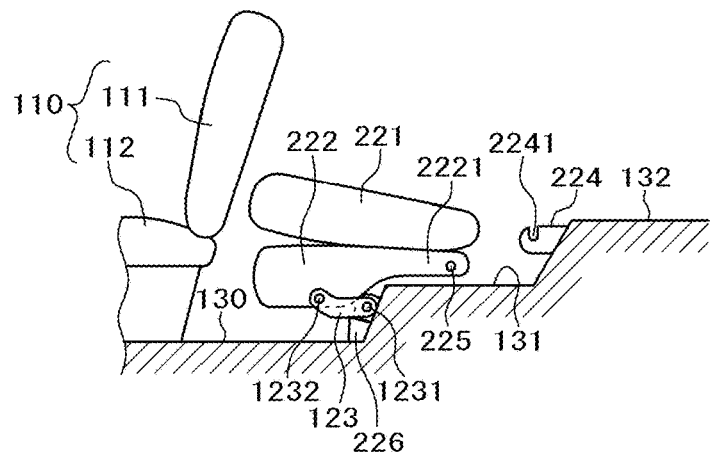
FIG. 6 is a figure showing the vehicle seat in the second embodiment of the present invention and is a side view of the vehicle seat showing a dive-down state in which the seat back of the rear seat is flattened on the seat cushion and is further folded forward.

By forming the rear portion 2221 of the seat cushion 222 to be thin in thickness like this, in the state that the seat cushion 222 is folded forward (dive-down) by the use of the link 123, it becomes possible to make the state shown in FIG. 6 with the upward back surface of the seat back 221 kept almost in parallel to the floor surface 130.

Further, by adjusting the thickness of the rear portion 2221 of the seat cushion 222, it becomes possible to make the upward back surface of the seat back 121 become almost the same height as the floor surface 132 in the state that the seat cushion 222 is folded forward (i.e., dive-down), and hence, it becomes possible to utilize the space of a cargo room over the floor surface 132 as being more spacious.

According to the present embodiment, because the link mechanism is employed for the configuration that folds the seat cushion 222 forward (dive-down), the seat cushion 222 is enabled by the relatively simple structure to be moved in the forward-rearward direction and in the upward-downward direction.

Further, according to the present embodiment, since the link mechanism portions for diving the seat cushion 222 down are attached to the floor surface right under the rear seat, it can be avoided that the passenger seated on the rear seat hits on the link mechanism at his/her feet or legs, and thus, it becomes possible to prevent the passenger at the rear seat from being hurt in amenity.

Third Embodiment

In the present embodiment, a configuration that replaces the link 123 in the configuration having been described in the first embodiment with a lock mechanism will be described with reference to FIG. 7 through FIG. 9.

Figure 7:
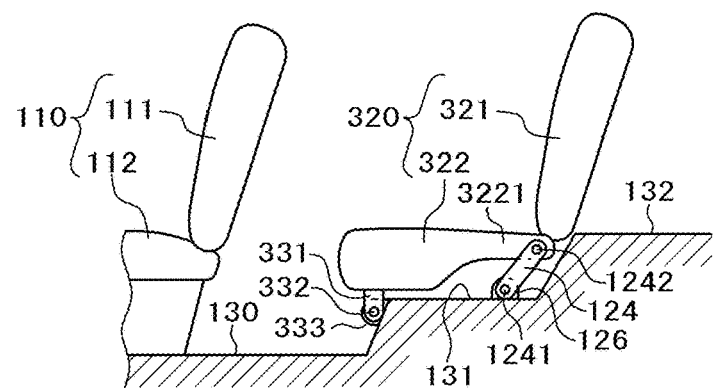
FIG. 7 is a figure showing a vehicle seat in a third embodiment of the present invention and is a side view of a vehicle seat with a seat back of the rear seat upstanding.

FIG. 7 is a figure corresponding to the configuration of FIG. 1 described in the first embodiment. The same components as those described in the first embodiment will be given the same reference numerals and will be omitted from being described.

In the configuration shown in FIG. 7, there is shown a state that a pin 332 fixed to a holding plate 331 is fitted in a groove portion 3331 (refer to FIG. 9) of a pin securing mechanism 333 secured to the floor surface 131 side, the holding plate 331 being attached to a lower portion on the front side of a seat cushion 322. At a rear portion of the seat cushion 322, the link 124 is engaged at around one (upper) end portion thereof with the pin 1242 secured to a frame portion (not shown) of a seat cushion 322 and is engaged at around the other (lower) end portion thereof with the pin 1241 that is supported by the bracket 126 secured to the floor surface 131.

Figure 8:
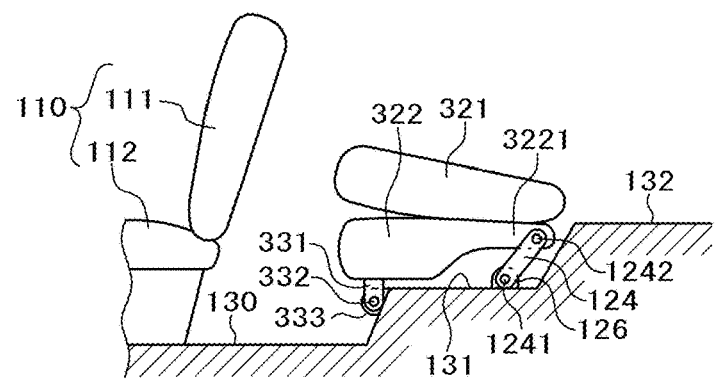
FIG. 8 is a figure showing the vehicle seat in the third embodiment of the present invention and is a side view of the vehicle seat with the seat back of the rear seat flattened on the seat cushion.

FIG. 8 shows the state that a seat back 321 is flattened on the seat cushion 322 side about a pivot center of a support mechanism (not shown).

In this state, the pin 332 secured to the holding plate 331 on the seat cushion 322 side is released from being secured by being fitted in the pin securing mechanism 333 secured on the floor surface 131 side. Then, the seat cushion 322 is pivoted about the pin 1241 through the link 124 and is stopped with a part of itself running into the floor surface 131. FIG. 9 shows a state that the seat cushion 322 is stopped with a part of itself running into the pin securing mechanism 333 secured to the floor surface 131.

In order that the upward back surface of the seat back 321 becomes almost the same height as the floor surface 132 in this state, in the present embodiment, a rear portion 3221 of the seat cushion 322 is formed to be thin in thickness, and thus, a recess is formed at a portion where the seat cushion 322 would otherwise interfere with the floor surface 131 when going down by being moved forward.

Figure 9:
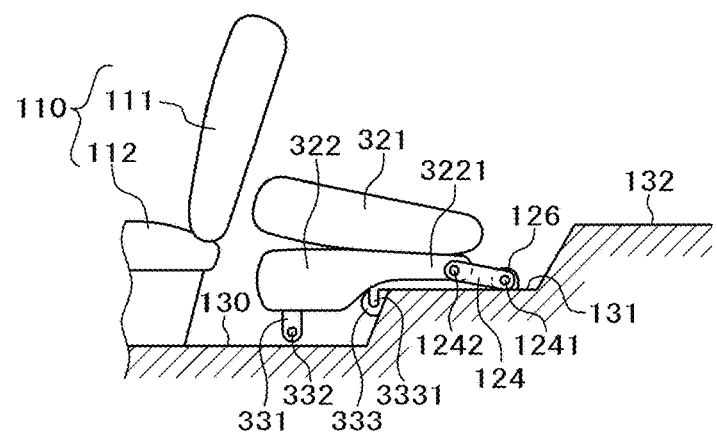
FIG. 9 is a figure showing the vehicle seat in the third embodiment of the present invention and is a side view showing a dive-down state in which the seat back of the rear seat is flattened on the seat cushion and is further folded forward.

By forming the rear portion 3221 of the seat cushion 322 to be thin in thickness like this, in the state that the seat cushion 322 is folded forward (dive-down) by the use of the link 124, it becomes possible to make the state as shown in FIG. 9 with the upward back surface of the seat back 321 kept almost in parallel to the floor surface 130.

Further, by adjusting the thickness of the rear portion 3221 of the seat cushion 322, it becomes possible to set the upward back surface of the seat back 321 to almost the same height as the floor surface 132 in the state that the seat cushion 322 is folded forward (di ye-down), and hence, it becomes possible to utilize the space of the cargo room over the floor surface 132 as being more spacious.

According to the present embodiment, because the link mechanism is employed for the configuration that folds the seat cushion 322 forward (dive-down), the seat cushion 322 is enabled by the relatively simple structure to be moved in the forward-rearward direction and in the upward-downward direction.

Further, according to the present embodiment, since the link mechanism portions for diving the seat cushion 322 down are attached to the floor surface right under the rear seat, it can be avoided that the passenger seated on the rear seat hits on the link mechanism at his/her feet or legs, and thus, it becomes possible to prevent the passenger at the rear seat from being hurt in amenity.

The invention may be embodied in other specific forms without departing from the sprit or essential characteristics thereof. The present embodiments are therefore to be considered in all aspects as illustrative and not restrictive, the scope of the invention being indicated by the appended claims, rather than by the foregoing description, and all changes which come within the meaning and range of the equivalency of the claims are therefore intended to be embraced therein.

What is claimed is:

1. A vehicle seat equipped with a seat cushion and a seat back, wherein:
   the seat cushion is connected to a vehicle floor by link mechanism portions so as to be disposed over a second floor surface higher than a first floor surface on which feet of a passenger seated on the vehicle seat are placed and lower than a third floor surface of a cargo space behind these at cushion, and
   a rear portion of the seat cushion is formed to have a reduced thickness such that when the seat back is folded to the seat cushion side and the seat cushion connected to the vehicle floor by the link mechanism portions is moved forward together with the seat back and pushed down relative to the second floor surface, an upward back surface of the seat back assumes almost a same height as the third floor surface while the rear portion of the seat cushion overlaps a port ion of the second floor surface without interfering with the second floor surface.

2. The vehicle seat according to claim 1, wherein the link mechanism portions are constructed by parallel link mechanism portions, the parallel link mechanism portions including a link mechanism portion connected to the second floor surface.

3. The vehicle seat according to claim 1, wherein the link mechanism portions are attached to positions that are under the seat cushion and that do not protrude from the seat cushion.

4. A vehicle seat equipped with a seat cushion and a seat back, wherein:
   parallel link mechanism portions are provided that connect the seat cushion to a vehicle floor so as to be disposed over second floor surface higher than a first floor surface on which feet of a passenger seated on the vehicle seat are placed and lower than a third floor surface of a cargo space behind the seat cushion,
   the seat cushion can be moved forward and downward relative to the second floor surface, with a posture of the seat back held by the parallel link mechanism portions in a state that the seat back is folded to the seat cushion side, and
   the seat cushion is configured with a recess portion in which a part of the second floor surface is received when the seat cushion is moved forward and downward relative to the second floor surface, such that an upward back surface of the seat back folded to the seat cushion side assumes almost the same height as the third floor surface.

5. The vehicle seat according to claim 4, wherein:
the parallel link mechanism portions connect the seat cushion to the second floor surface under the seat cushion and to a portion of the vehicle floor in a neighborhood of the second floor surface under the seat cushion.

6. The vehicle seat according to claim 5, wherein:
one part of the parallel link mechanism portions connects the seat cushion to a floor surface that connects the first and second floor surfaces, and
another part of the parallel link mechanism portions connects the seat cushion to the second floor surface under the seat cushion.

7. The vehicle seat according to claim 4, wherein the parallel link mechanism portions are attached to positions that are under the seat cushion and that do not protrude from the seat cushion.

8. The vehicle seat according to claim 1, wherein the seat cushion is dimensioned such that a space between the vehicle seat and an adjacent seat in front thereof is insufficient to allow the seat cushion to be dropped down to the first floor surface.

9. The vehicle seat according to claim 4, wherein the seat cushion is dimensioned such that a space between the vehicle seat and an adjacent seat in front thereof is insufficient to allow the seat cushion to be dropped down to the first floor surface.

* * * * *